(12) United States Patent
Michalke et al.

(10) Patent No.: US 8,564,657 B2
(45) Date of Patent: Oct. 22, 2013

(54) OBJECT MOTION DETECTION SYSTEM BASED ON COMBINING 3D WARPING TECHNIQUES AND A PROPER OBJECT MOTION DETECTION

(75) Inventors: Thomas Michalke, Stuttgart (DE); Robert Kastner, Frankfurt (DE)

(73) Assignee: Honda Research Institute Europe GmbH, Offenbach/Main (DE)

(*) Notice: Subject to any disclaimer, the term of this patent is extended or adjusted under 35 U.S.C. 154(b) by 723 days.

(21) Appl. No.: 12/781,272

(22) Filed: May 17, 2010

(65) Prior Publication Data

US 2010/0315505 A1  Dec. 16, 2010

Related U.S. Application Data

(63) Continuation-in-part of application No. 12/765,043, filed on Apr. 22, 2010, now abandoned.

(30) Foreign Application Priority Data

May 29, 2009  (EP) ..................................... 09161520

(51) Int. Cl.
*H04N 7/00* (2011.01)
*B60T 8/32* (2006.01)
*G05D 1/00* (2006.01)

(52) U.S. Cl.
USPC ........... 348/118; 348/116; 382/103; 382/104; 701/93; 701/96

(58) Field of Classification Search
None
See application file for complete search history.

(56) References Cited

U.S. PATENT DOCUMENTS 5,717,412 A * 2/1998 Edwards ............................ 345/7
2006/0221072 A1* 10/2006 Se et al. ............................ 345/420

(Continued)

FOREIGN PATENT DOCUMENTS

EP   1 361 543    11/2003
WO  2009/024329  2/2009

(Continued)

OTHER PUBLICATIONS

Sanae Shimizu et al: "Moving object detection by mobile Stereo Omni-directional System (SOS) using spherical depth image" Pattern Analysis and Applications, Springer-Verlag, Lo, vol. 9, No. 2-3, Nov. 8, 2005, pp. 113-126, XP019431599 ISSN: 1433-755X.*

(Continued)

*Primary Examiner* — Mehrdad Dastouri
*Assistant Examiner* — James Anderson, II
(74) *Attorney, Agent, or Firm* — Squire Sanders (US) LLP (57) ABSTRACT

The invention proposes a method for detecting dynamic objects in the scene in a driver assistance system of a vehicle, comprising the steps of:
  feeding signals from sensors (internal sensors, 3D sensors, cameras) of the vehicle to the driver assistance system,
  generation of a surrounding model using 3D world positions based on the sensor signals and,
  combination of 3D Warping-based approaches and optical flow based approaches, whose gained novel key points are:
  a) Restriction of the search space of an optical flow method based on the computation results of the 3D warping method,
  b) Additionally, to a) also an optimal parameterization of the optical flow approach in terms of search direction, amplitude, etc.,
  c) Refinement and verification of the detection results of one of the methods based on the computation results of the other method (if both approaches are running in parallel),
  storing the detected dynamic objects and their measured motion parameters for their use in, e.g. a collision avoidance or path planning system.

19 Claims, 6 Drawing Sheets

(56) References Cited

U.S. PATENT DOCUMENTS

2007/0198144 A1* 8/2007 Norris et al. .................. 701/23
2007/0286275 A1* 12/2007 Kimura et al. ........... 375/240.01

FOREIGN PATENT DOCUMENTS

WO    WO 2009/024349 A1    2/2009
WO    WO 2009024349 A1 *    2/2009

OTHER PUBLICATIONS

Kalman, R.E., "A New Approach to Linear Filtering and Prediction Problems", Transactions of the ASME-Journal of Basic Engineering, vol. 82, no. Series, 1960 pp. 35-45.
Konolige, Kurt, "Small Vision System: Hardware and Implementation", Eight International Symposium on Robotics Research, 1997, pp. 1-10.
Luan, Xuming "Experimental Investigation of Photonic Mixer Device and Developement of TOF 3D Ranging Systems Based on PMD Technology", PHD Thesis, Nov. 2001, 136 pages.
www.velodyne.com/lidar.
Badino, Hernan et al., "Stereo Vision-Based Detection of Moving Objects Under Strong Camera Motion", 1st International Conference on Computer Vision Theory and Applications, Feb. 25-28, 2006, 8 pages.
Vaudrey, Tobi et al., "Integrating Disparity Images by Incorporating Disparity Rate", 2nd workshop "Robot Vision", Feb. 18-20, 2008, pp. 1-14.
Willert, Volker et al., "Non-Gaussian Velocity Distributions integrated Over Space, Time, and Scales", IEEE Transactions on System, Man, and Cybernetics-Part B: Cybernetics, vol. 36, No. 3, Jun. 2006, pp. 482-493.
Bronstein, I.N., et al., "Taschenbuch der Mathematik", 1999, Book.
Jahne, Bernd, "Digital Image Processing", Springer, 2005, Book.
EP Communication/European Search Report, Aug. 31, 2009, a total of 15 pages.
Schmudderich et al., "Estimating Object Proper Motion Using Optical Flow, Kinematics, and Depth Information", IEEE Transactions on System, Man and Cybernetics, vol. 38, No. 4, Aug. 2008, pp. 1139-1151.
Shimizu et al., "Moving object detection by mobile Stereo Omnidirectional System (SOS) using spherical depth image", Pattern Analysis and Applications, vol. 9, No. 2-3, Nov. 2005, pp. 113-126.
Cutler et al., "View-based Interpretation of Real-time Optical Flow for Gesture Recognition", IEEE Comput, Soc, Apr. 1998, pp. 416-421.
Schaarschmidt et al., "Key Gesture Spotting for a Mobile Robot", International Symposium on Robotics and Automation (ISRA), 2004, pp. 1-6.
Bertozzi et al., "Obstacle Detection and Classification fusing Radar and Vision", IEEE Intelligent Vehicles Symposium, Jun. 2008, pp. 608-613.
Michalke et al., "A Generic Temporal Integration Approach for Enhancing Feature-based Road-detection Systems", Proceedings of the 11th International IEEE Conference on Intelligent Transportation Systems, Oct. 2008, pp. 657-663.
Konolige, "Small Vision System: Hardware and Implementation", Eigth International Symposium on Robotics Research, 1997, a total of 10 pages.
Talukder et al., "Real-time Detection of Moving Objects from Moving Vehicles using Dense Stereo and Optical Flow", Proceedings of 2004 IEEE/RSJ International Conference on Intelligent Robots and Systems, Sep.-Oct. 2004, vol. 4, pp. 3718-3725.
Nieto et al., "Stabilization of Inverse Perspective Mapping Images based on Robust Vanishing Point Estimation", Proceedings of the 2007 IEEE Intelligent Vehicles Symposium, Jun. 2007, pp. 315-320.

* cited by examiner

OBJECT MOTION DETECTION SYSTEM BASED ON COMBINING 3D WARPING TECHNIQUES AND A PROPER OBJECT MOTION DETECTION

CROSS-REFERENCE RELATED APPLICATIONS

This is a Continuation-in-Part (CIP) application of U.S. patent application Ser. No. 12/765,043, filed Apr. 22, 2010. The disclosure of the prior application is hereby incorporated by reference herein in its entirety.

FIELD OF INVENTION

The present invention generally relates to artificial (automated) vision-based systems, which can be employed e.g. for driver assistance systems (DAS) (for cars, motorbikes, planes, boats, trains, . . . ) or autonomous robots.

The invention relies on a combination of techniques for detecting dynamic (i.e., moving) objects based on visual information and depth information and can be deployed in driver assistance systems. The present invention develops further the post-published EP 09 150 710.3 (see [11]), the teaching of which is hereby explicitly included by reference.

Driver assistance systems are control systems for vehicles or intelligent vehicle technologies that aim at increasing the comfort and safety of traffic participants. Potential applications of such systems include lane departure warning, lane keeping, collision warning or avoidance, adaptive cruise control and low speed automation in congested traffic.

Driver assistance systems in the context of the present invention can thereby output scene-analysis information to a driver, "assist" an action triggered or performed by a driver, but can also autonomously start and carry out a control action for the vehicle.

The driver assistance system can be provided with information concerning the environment of the vehicle, the status of the vehicle and the driver.

The application of the invention, which will be used for illustration purposes in the present specification, is the car domain. However, the invention is not limited to this, but can also be applied to other domains as airplanes in the take-off or landing phase or for mobile, especially autonomous robots. Also in these domains the detection of dynamic objects is of vital importance for safe operation.

A preferred embodiment of the present invention is now described. Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

BACKGROUND OF THE INVENTION

Driver assistance systems are known to operate with and in the vicinity of human beings, which leads to high safety requirements, when a driver assistance system is able to make decisions and autonomously generate behavior (e.g., autonomous braking after the detection of an obstacle on the lane). The vehicle domain can be subdivided into dynamic (e.g., cars, bicycles) and static objects respectively static scene elements (e.g., parking cars, road, buildings).

For all static scene elements the system has to cope with the inaccuracy of measurements (i.e., the sensor variances), for whose compensation a number of efficient, well-known approaches exist (e.g., Kalman filter [1] for making approaches more robust that rely on noisy input data, as, e.g., model-based lane marking detection systems [2]). For dynamic scene elements in addition to the handling of sensor variances the object-induced motion must be taken into account. In the following, the motion of such dynamic objects will be called "object motion", as opposed to the "vehicle ego-motion" of the car that carries the ADAS (see glossary) and sensory devices. Said dynamic objects are highly relevant for a driver assistance system, since unexpected motion of dynamic objects can result in dangerous situations that might injure humans. Hence, approaches which robustly gather information about dynamic scene elements are highly relevant for driver assistance systems.

Once the scene is subdivided into static and dynamic scene elements for all dynamic objects the object motion can be modeled in order to incorporate it into the behavior generation and planning of the driver assistance system (e.g., usage of dedicated motion models for estimating the trajectories of dynamic object and including them into a collision mitigation module). In the following, the existing approaches for detecting object motion will be grouped into 3 classes:
1. Simple basic approaches,
2. Approaches based on optical flow and
3. The 3D Warping approach.

Simple Basic Approaches

Figure 4:
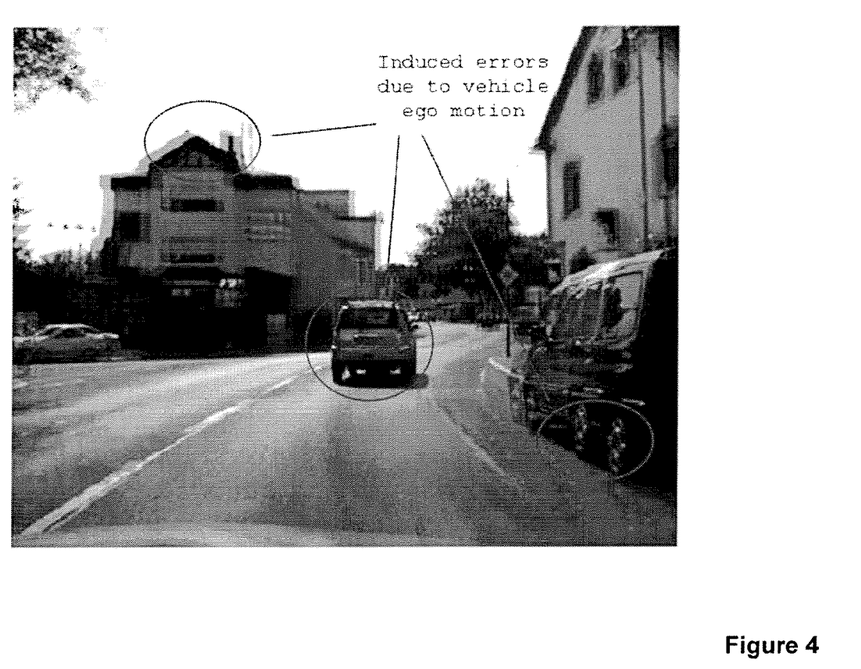
FIG. 4 shows two consecutive images in superposition showing potential difficulties of differential images as feature for detecting dynamic objects, FIG. 5 gives a structural overview of one combination of POM and 3D Warping, which is the central issue of this invention

Vision-based approaches in the surveillance domain typically use differential images for detecting dynamic objects. Here, an image at time t is subtracted by the one at time t−1. But in case of strong ego motion of the camera (as typically present in the car domain) differential images cannot reliably detect dynamic objects, as it is shown in FIG. 4. The vehicle ego-motion causes a change in nearly all image pixel positions, making a reliable separation between vehicle ego-motion and object motion impossible.

A method, which uses disparity as exclusive information source is described in [8]. The algorithm integrates two consecutive disparity frames based on a pixel-wise Kalman filtering method. Additionally, the change of disparity (i.e. position change in depth direction) is added in the process model of the Kalman filter. However, no lateral and vertical movements can be modeled. The approach is targeted at improving the depth information, trying to solve the problem that disparity-based approaches generate incorrect depth estimates for moving objects. Summarizing, the approach aims at gathering a dense depth map, with reduced errors by applying temporal integration. As a byproduct, dynamic objects can be detected, but only in case no lateral object motion takes places on the image plane.

Optical Flow (Proper Object Motion Detection)

Other approaches (see e.g. [6]) combine the optical flow (pixel-wise correlation of two consecutive images deriving the motion magnitude and direction on the image plane) with the disparity map of a stereo camera system based on Kalman filters, which provides the 3D position and 3D velocity of discrete points in the image. These discrete points are used to compute the ego-motion of the camera vehicle over multiple frames. However, the motion of other objects is calculated based on optical flow computation between a predicted 2D warped pixel image and the current image.

In contribution [13] by Shimizu a system for detection of moving humans in an indoor environment is described. The system is carried by a mobile robot that fulfils a surveillance task. The system is based on a camera setup of 36 stereo cameras that allow 360 degree surveillance.

Typical systems for the detection of dynamic objects compute the optical flow between a predicted (Warping of the previous image, counteracting the ego-motion of the robot) and the current captured image. The optical flow will be different from zero for image regions containing dynamic objects.

Opposed to that, the system described in [13] relies on stereo data for the computation of a depth map of the scene (the depth map is organized in image coordinates, see Z-map on bottom right corner of FIG. 1 of [13]). Using the depth map of the previous frame and dead reckoning the ego-motion is compensated, leading to a predicted depth map. Computing the difference between the predicted and measured depth map results in differential depth map (in image coordinates) that shows unexpected peaks at regions containing dynamic objects. Unanswered remains, how the resulting depth map is post processed, because each moving object will cause 2 regions of changed depth (the new position and the old position).

Document [13] relates to the invention insofar as a role of stereo information for the detection of dynamic objects is recognized. However, the approach works on the depth map (see Z-map in bottom right corner of FIG. 1 of [13]) and therefore in image coordinates, as known from typical optical-flow-based image-Warping-approaches. A correspondence problem arises since all moving objects influence the differential depth map twofold (peak on the old and the new object position, no information in the differential depth map present to derive which position is which). Furthermore, the domain of application is indoors on a mobile robot platform with the central application of surveillance of humans. With such a specific task and a rather structured environment, the detection task is eased considerably allowing the detection system to be tuned to its environment (search for objects in the height of humans, typical object size-related constraints are exploited, camera system is designed to exclusively detect close objects).

A related system for the detection of dynamic objects is presented in [14], which again describes a system mounted on a mobile robot. The approach is based on a computed dense optical flow field and dense stereo disparity computed from the images of a pair of calibrated stereo cameras. Different from the system described in [13] an expected disparity map is computed (the raw data for computing depth information) taking into account the ego-motion of the vehicle and comparing the expected disparity map to the measured disparity map by computing a kind of "disparity flow". Modulo noise, regions containing a residual disparity flow, mark dynamic objects. Summarizing, the approach computes the so-called 3D egoflow (as stated explicitly by the authors, this should not be confused with 3D coordinates in X-Y-Z sense, see Section 2 of [14]). More specifically, the 3D egoflow is hence the 3D field of changes in u and v-image coordinates as well as the change in disparity.

In some aspects similar to [13], in [15] an optical-flow-based system for human gesture recognition is described that runs on a static platform in an indoor environment using a monocular camera (i.e., no stereo data can be gathered). The presented real-time system computes the optical flow using a correlation-based algorithm (in this aspect similar to [7]).

However, instead of running on RGB color images, the system described in [15] computes the optical flow on a specific color space (the YUV color space) thereby aiming at a high degree of illumination robustness. The gathered optical flow is coarsely clustered using a kind of region growing on the optical flow field. The resulting flow clusters are compared to a restricted number of predefined flow models representing the detectable motion-related gestures. The recognition problem is simplified by the fact that the system platform is static and located in a rather well-structured indoor environment.

Another human gesture classifier is described in [16]. Although the system itself does not rely on optical flow as information source, the contribution can still serve as document of reference. Following the argumentation of the authors, the (raw and not post-processed) optical flow is unreliable and highly influenced by noise. According to the authors, it is hence not applicable for the robust detection of moving humans in an indoor environment.

Another approach, which uses the optical flow to estimate dynamic objects, is the so-called Proper Object Motion (POM) described in [7] (see also WO patent 2009/024349A [12]). Here, the current image, at time t, is pixel-wisely back projected to the image at time t−1, taken the known ego movement into account and assuming that the overall scene is static. Afterwards the optical flow is computed between the image captured at t−1 and the back projected image t−1. The optical flow marks the position of dynamic objects present in the scene. This and comparable methods rely on the optical flow for object motion detection, hence searching for pixel-wise changes on the image plane. It is important to note, that the optical flow is resource-demanding as well as error prone, especially at the borders of the image. However, the central problem and flaw of the Warping approach with optical flow is that only object motion lateral to the movement of the ego camera vehicle can be detected (e.g., a bicycle crossing the road in front). However, motion that is oriented longitudinal to the vehicle's course cannot be detected, since there is no measurable lateral motion on the image plane and hence no optical flow is present (e.g., a vehicle driving on the road in front brakes hard and gets nearer). As shown later the drawbacks mentioned above will be resolved using the here described combination approach.

All previously mentioned optical-flow-based system approaches described in documents [7, 12-15] have in common that they are applied indoors. Following documents [7, 16] optical flow has a restricted quality that at least requires some form of post-processing or according to document [16] is more or less inappropriate.

It is important to note that the quality of the optical flow field strongly depends on the characteristics of the application area. As opposed to a typical outdoor traffic scenarios, indoor environments (especially the typical office environment such prototype systems are tested in) provide:
1. a highly stable illumination situation (artificial light, stable weather conditions),
2. separation of foreground and background typically straightforward (unicrome walls, typical angles between walls, simple 3D-related relative orientation of surfaces of 90°),
3. low complexity (number and type of present objects is restricted),
4. typically humans are the only dynamic objects present, additionally their motion parameters (velocity, moved object parts, motion direction) are highly stable, once a moved object is found it is immanently classified as human (after the object detection, no additional classification step needed),
5. restricted ego-motion of the camera-carrying robot (or even static systems).

All these issues ease the detection and classification tasks considerably, since they allow the application of simple heuristics and incorporation of environment-related pre-knowledge. Still, following document [16], the optical flow is hardly applicable for the recognition of motion gestures.

Additionally, the application of optical flow is troublesome.

Following document [15], heavy environment-related assumptions were made when designing and testing the robot system ("background is relatively static", "illumination changes slowly", "only dominant motion" is of interest, the flow is computed "for pixels that satisfy a motion detection criterion" (differential images computed on low-pass filtered image pair), "computationally expensive algorithm" was realized, static (i.e. not ego-propelled) system. Still "the magnitude [of the flow field] can vary considerably" and only six detectable motion patterns are supported.

Following document [7], a sophisticated post-processing step c is needed to reduce the influence of outliers. The Mahalanobis norm weights the detected motion magnitude with a confidence measure coming from the correlation-based optical flow computation.

Clearly, the aforementioned 5 requirements for an application in an indoor environment are not fulfilled in an outdoor environment, e.g. a (traffic) domain. As a result, the design of robust systems and algorithms is much more challenging. Since an indoor application of optical flow is already challenging, its direct application in outdoor traffic scenarios is not feasible. Consequently, no publications exist that described resilient pure optical-flow-based applications for the traffic domain. Following the general attitude in the ADAS community, as stand-alone solution the optical flow is a too unreliable and noisy information source that is therefore somewhat neglected for the traffic domain. Different from that numerous highly robust approaches for the computation of 3D data exist that also can be used for the detection of dynamic objects.

3D Warping

Figure 1:
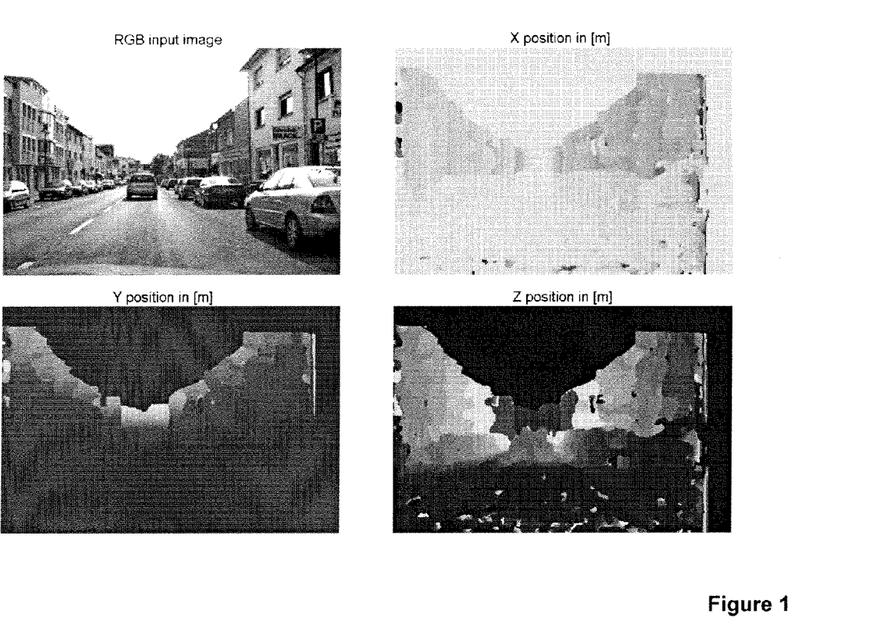
FIG. 1 shows dense 3D data of the scene.

Another complementary method for detecting dynamic objects is the 3D Warping approach, which is described in detail in patent application [11]. In order to provide the technical background for the current invention, the main traits are summarized in the following (please refer to FIG. 3 for an overview of the 3D Warping system). For the following description, the algorithm computes the magnitude of object motion based on sensors delivering 3D world coordinates (e.g., disparity information coming from stereo cameras [3] (see FIG. 1 for the resulting 3D world maps), Photonic Mixer Device [4], or a dense laser scanner (e.g., the high definition Lidar sensor Velodyne [5])).

Figure 2:
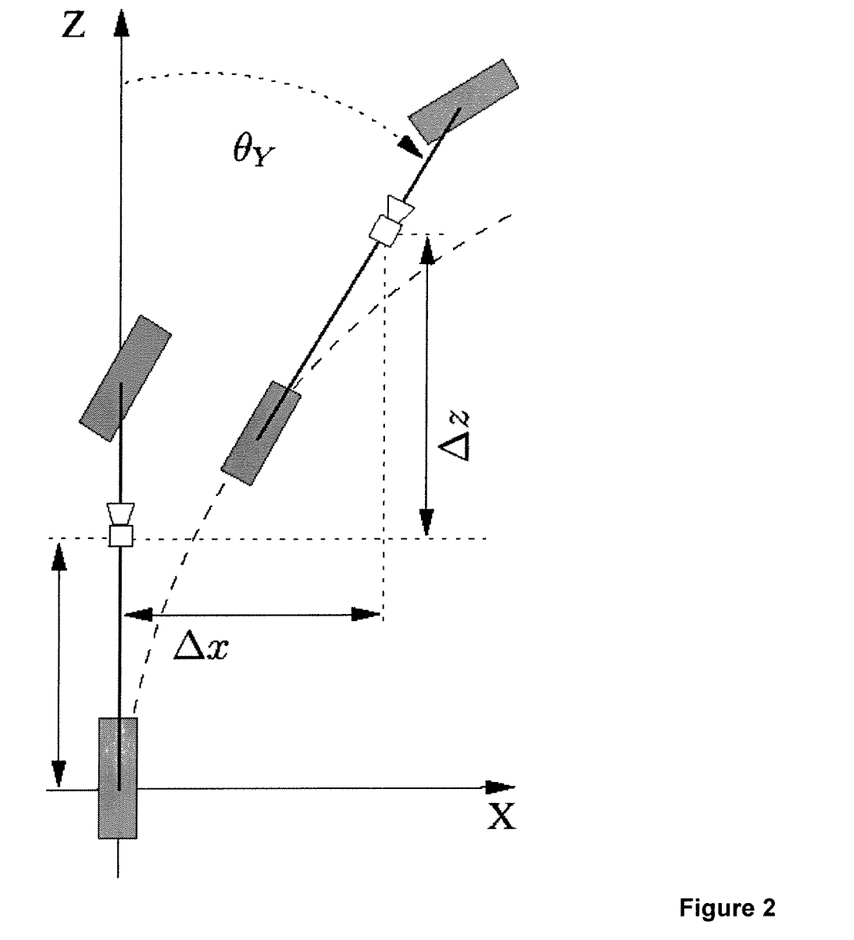
FIG. 2 explains a single track model.

The detection of dynamic objects is based on the comparison of predicted (i.e., 3D warped) and measured 3D data of the scene. More specifically, in the 3D Warping procedure the 3D world coordinates of the scene (containing static and dynamic objects) at one time step are transformed in a way that includes the motion of the ego vehicle in 3D coordinates. The 3D motion of the ego vehicle can be deduced from the longitudinal velocity and yaw rate of the vehicle, both accessible on the Controller Area Network (CAN) bus, using a single track model (see FIG. 2). In the following, the procedures for the forward 3D Warping (and backward 3D Warping, set in brackets [ ]) (see also glossary) are described. Both approaches have different advantages and drawbacks.

To be more precise, the 3D world coordinates at a time step are predicted into the future [backwards in time] under the assumption that all objects in the scene are static. The 3D world coordinates are predicted based on the measured ego vehicle motion induced longitudinal and lateral motion as well as yaw rate coming from a single track model (refer to FIG. 2). The thereby predicted a priori 3D world position is compared to the measured a posteriori 3D world position in the next time step [previous time step]. The 3D residuum of the comparison between 3D warped and real 3D world position marks all dynamic scene elements. The residuum is given in metric world coordinates (i.e., a 3D object motion induced position change). In order to get the corresponding pixel position (u,v) of the detected dynamic object (for a given 3D world position X,Y,Z) a pin hole camera model can be used.

Figure 3:
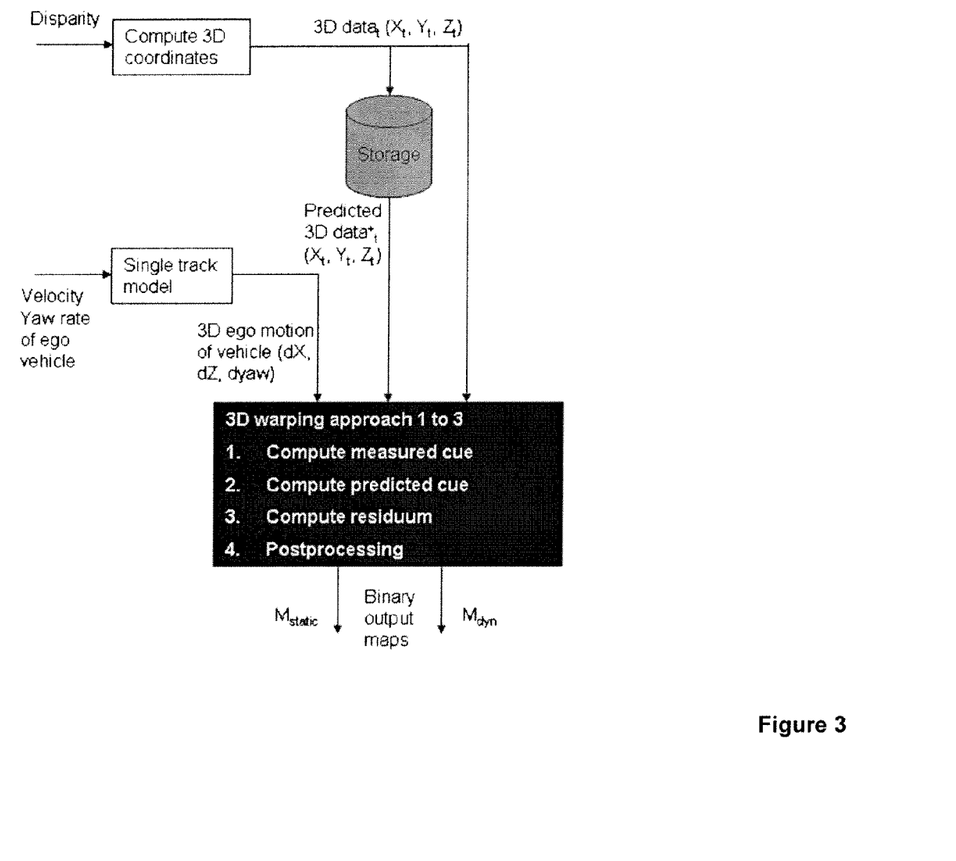
FIG. 3 shows a system overview for 3D Warping.

In the following, the 3D Warping approach is described in detail, distinguishing 4 processing steps as visualized in FIG. 3.

a) Computing the Measured Cue

The approach described here uses dense 3D data as input. In this context, "dense" means that for the whole scene 3D data exists. To this end, any dense depth sensors can be used, as for example, a stereo camera system, a Photonic Mixer Device [4] or a dense laser scanner [5]. Based on these sensors, the X, Y, and Z-maps (i.e., depth map) can be computed. In the following the information of the X, Y, and Z-maps will be transformed into a 3D scene representation (see glossary).

b) Computing the Predicted Cue

The computation can be done in different ways and combinations, regarding the amount of processed data. Three different computational methods were proposed in [12], which are iconic-based, voxel-based, and envelope-based computation.

The first computational method runs completely iconic (i.e., all 3D voxels are handled independently). More specifically, this means that the known 3D positions of all known points in the environment are adapted taking the 3D vehicle ego motion into account. The adapted 3D position is used to 3D warp each point of the 3D representation (see glossary) independently. Then the predicted (3D warped) and the measured scene representations (see glossary) are compared to determine dynamic objects, which can be done by any distance metric in 3D space.

The second computational method builds up a 3D voxel cloud (i.e., cloud of 3D segments) of the scene. Different from the first iconic approach a region based post-processing and modeling within the voxel cloud takes place by use of scene models (see glossary). Thereby information from neighboring voxels is propagated and geometric 3D object models are introduced, which correct outlying voxels. These measures improve the overall accuracy of the approach.

The third computational method reduces the problem complexity by restricting the processing to one (or a few) surface (s) in the environment. In the car domain this could be the road surface. Only scene elements on this surface are considered. Based on this information an envelope is build up, which is called environmental envelope (see glossary), reducing the complexity of the problem and allowing efficient heuristics for post-processing.

Additionally, the combination of the computational methods is possible, as e.g. using a number of 3D voxel clouds with the scene models for 3D Warping and the remaining voxels are iconic 3D warped. Also, the amount of processed data can be affected in that way.

c) Computing Residuum

Computing the difference (residuum) between the measured cue and the predicted cue results in residuum regions in 3D that contain values at positions where dynamic objects are present. Moreover, from the residuum regions the relative motion of the dynamic object in 3D coordinates can be derived. The residuum computation can be done by any distance metric in 3D space.

For methods 1 and 2 the residuum regions define image regions (by back projecting with a pin-hole camera model using 3D to 2D mapping) that hold dynamic objects as well as the magnitude of the object motion in X, Y, and Z direction. For method b)3 the residual environmental envelope defines the motion of dynamic objects in X and Z direction only (height Y is defined as constant over the whole environmental envelope). For determining the corresponding image position all found dynamic objects are mapped from 3D (X,Y=const, Z) to the 2D image surface.

d) Post-Processing

In order to handle artifacts, the described procedure might produce, morphological operations on the residuum's are carried out (see [10] for details on such morphological operations). This assures that only larger residuum regions are interpreted as being dynamic. Furthermore, by including vehicle domain specific context (top-down knowledge), all objects that are known to be static (e.g., found road segments) can be sorted out, easing the 3D Warping procedure. Additionally, data from a satellite-based navigation system can be incorporated providing further knowledge of the scene, e.g., 3D GPS position for static scene content).

As described in [11], the mentioned computation methods (in part "b) Computing the predicted cue") have different advantages and drawbacks making them more or less applicable in different domains and applications, as summarized in the following Table 1. Table 2 summarizes the differences between existing pixel-based 2D Warping procedures and the 3D Warping approach on 3D coordinates.

TABLE 1

Comparison of the proposed computation methods for detecting dynamic objects

|  | Optical flow based 2D Warping | Iconic 3D Warping | Voxel cloud 3D Warping | Region based 3D Warping (environmental envelope) |
|---|---|---|---|---|
| Advantages | No camera parameters (calibration) necessary No further sensors necessary | Accurate | Very accurate | Fast |
|  |  | Relative motion of detected objects in world coordinates is determined |  |  |
|  |  | Dynamic object moving in the direction of the ego vehicle can be detected |  |  |
| Drawback | Only objects with |  | Slow | Lower accuracy |

TABLE 1-continued

Comparison of the proposed computation methods for detecting dynamic objects

| | Optical flow based 2D Warping | Iconic 3D Warping | Voxel cloud 3D Warping | Region based 3D Warping (environmental envelope) |
|---|---|---|---|---|
| | horizontal motion components Slow Low accurateness | Needs dense depth data (vision based, PMD or laser scanner), the denseness and quality of such depth data could be improved by satellite-based navigation data, e.g., 3D GPS position for static scene content). | | |

TABLE 2

Conceptional differences between pixel based 2D Warping with optical flow and 3D Warping on 3D coordinates

| Criterion | Optical flow based 2D Warping (Proper Object Motion) | 3D Warping on 3D coordinates |
|---|---|---|
| Input data | Consecutive images of a monocular camera, dense 3D data | Dense 3D data |
| Computational level | Pixels on the image | 3D world positions |
| Detectable object motion | Lateral object motion (i.e., orthogonal to the motion of ego camera vehicle) | Longitudinal and to a certain extend lateral object motion (i.e., motion in the direction of the ego camera vehicle and orthogonal to it). |
| Output data | Detected object motion in pixels on the image plane between two consecutive images | Detected object motion in 3D coordinates |

Invention

The invention proposes an improved method for object motion detection using 3D data and visual information.

This object is achieved by means of the features of the independent claims. The dependent claims develop further the central idea of the present invention.

According to a first aspect, a method for detecting dynamic objects in the (visually) sensed scene of a driver assistance system of a vehicle with ego-motion, comprises the steps of:
providing visual signals of the environment of a vision sensor with ego-motion,
detecting the proper motion (see glossary) of objects on the input field of the vision sensor based on the detected optical flow,
detecting the motion of objects based on a 3D representation model (see glossary) of the environment and using a 3D Warping on the basis of predicted and sensed 3D data, the predicted 3D data being generated based on measured 3D data and data representing the ego-motion, and
combining the 3D Warping-based and the optical-flow-based object motion detection, and
storing information on the detected dynamic objects and their measured motion parameters.

The information on the detected dynamic objects can be used for collision avoidance or path planning.

Figure 5:
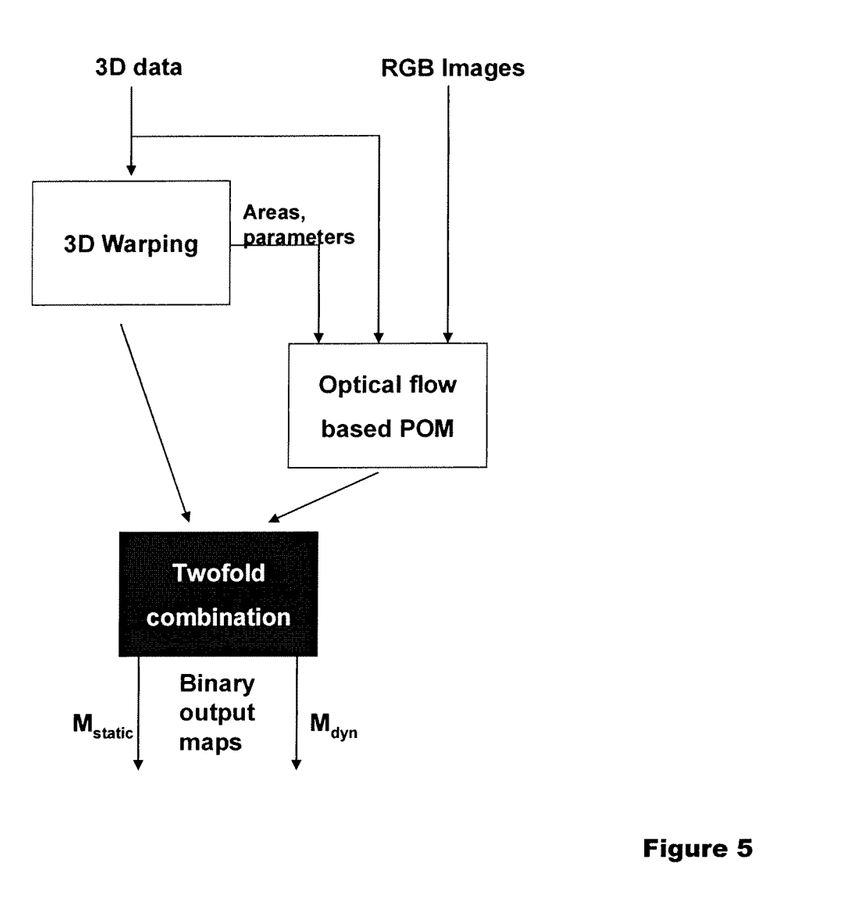

The 3D Warping-based and the optical-flow-based object motion detection may be combined such that the search space of the respectively other detection is restricted and detection parameters are supplied to the respectively other detection. Also, a combination of both approaches is possible, when directly comparing and weighting the results of the two (see FIG. 5 for a system overview).

The 3D-Warping-based object motion detection may parameterize, the optical-flow-based object motion recognition, e.g. depending on the motion direction and amplitude of objects.

More specifically, only those regions in the 3D-Warping-based object motion detection, which indicate a lateral motion relative to the ego-motion may be processed selectively by the optical-flow-based object motion recognition.

Also, the optical-flow-based object motion detection can provide regions with possible lateral motion, where the 3D Warping is applied. The lateral motion is indicated by an aura around a moving object, due to the change in size of the object (see FIG. 6 last column).

The 3D Warping-based and the optical-flow-based object motion detection can be run in parallel and may be combined such that the detection results of one approach are refined and verified by the respectively other detection method.

Information from a 3D depth sensor, such as e.g. a rotating laser scanner can be used to generate sensor signals.

Information from a 2D depth sensor such as e.g. Photonic Mixer Device may be used to generate sensor signals.

Information from a 1D depth sensor (e.g., laser scanner) can be used, together with 2D vision signals, to generate 3D data.

A dense depth sensor may provide 3D data and information of the ego-motion computed based on a single track model.

Input data for the single track model can come from additional sensors for vehicle velocity and/or yaw-rate.

Both methods may run in parallel.

A further aspect of the invention relates to a driver assistance computing unit, designed to carry out a method as explained above.

The invention also proposes a vehicle being equipped with such a driver assistance computing unit.

Another aspect relates to an autonomous robot being equipped with such a computing unit.

A driver assistance system with a driving path and/or surrounding model generation apparatus, the model generation apparatus may comprise:
- means for providing visual signals of the environment of a vision sensor with ego-motion,
- computing means detecting the proper motion of objects on the input field of the vision sensor based on the detected optical flow,
- computing means for detecting the motion of objects based on a 3D representation model of the environment and using a 3D Warping on the basis of predicted and sensed 3D data, the predicted 3D data being generated based on measured 3D data and data representing the ego-motion, and
- computing means for combining the 3D Warping-based and the optical-flow-based object motion detection, and
- means for storing information on the detected dynamic objects and their measured motion parameters.

The vision sensor may be a dense depth sensor providing 3D data and information on ego-motion.

The vision sensor can be accessible on a CAN bus and/or an additional sensor.

Further features, objects and advantages of the present invention will become evident when going through the following detailed description of preferred embodiments of the present invention when taken in conjunction with the figures of the enclosed drawings.

The invention combines the two approaches (3D Warping and Proper Object Motion "POM") in order to exploit their respective advantages while resolving the existing drawbacks. The combination of the two named approaches is of importance when aiming at a real-time implementation of an ADAS in a vehicle. In general, there are five possible combinations: First, both approaches work in parallel and one of the approaches results are verified and refined by the respectively other one (two combinations). Second, the 3D Warping defines regions where the POM is applied and additionally the POM can also be parameterized in an optimal way to reduce the computational requirements (two combinations). Finally, the POM defines regions where the 3D Warping is applied, but this combination is not threaded here in detail, but mentioned for completeness.

The invention thereby improves the rather broad and generic results gathered by the 3D Warping approach using a well-parameterized form of POM. Based on this a refinement and verification of the 3D Warping detection results can be achieved (see FIG. 5 for a descriptive overview of the invention and table 3 for combinations between 3D Warping (3DW) and optical-flow-based 2D Warping (POM)). In the following, the proposed combination approach will be explained in more detail.

TABLE 3

Possible combinations between pixel based 2D Warping with optical flow and 3D Warping on 3D coordinates

| Criterion | Optical-flow-based POM in parallel with 3D Warping | POM results define regions for 3D Warping | 3D Warping results define regions for POM |
|---|---|---|---|
| Required Computational power | Very high to high, due to parallel computation, but depends on optical flow parameters. | Very high, due to optical flow computation on all scales, directions and ranges. | Medium, optical flow is only computed on certain regions. |
| Computational level | Pixels on the image and parallel 3D world positions. | First Pixels on the image, second 3D world positions. | First 3D world positions, second pixels on the image for defined areas. |
| Detectable object motion | Lateral and Longitudinal object motion. | First, Lateral object motion and possible areas of longitudinal motion. Second, Longitudinal and to a certain extend lateral object motion. | First, Longitudinal and to a certain extend lateral object motion. Second, refinement of Lateral object motion. |
| Output data | Detected object motion in pixels on the image plane between two consecutive images and Detected object | Detected object motion in pixels on the image plane between two consecutive images and for refined areas | Detected object motion in 3D coordinates and for refined areas object motion in pixels on the image plane between two consecutive images. |

TABLE 3-continued

Possible combinations between pixel based 2D
Warping with optical flow and 3D Warping on 3D coordinates

| Criterion | Optical-flow-based POM in parallel with 3D Warping | POM results define regions for 3D Warping | 3D Warping results define regions for POM |
|---|---|---|---|
| | motion in 3D coordinates. | object motion in 3D coordinates. | |

3D Warping Results Define Regions for POM Computation

In order to detect dynamic objects, the 3D Warping approach computes the residuum between predicted and measured 3D coordinates (please refer also EPO patent application 09 150 710.3 (see [11]) for details). The residuum shows high values at scene points that contain dynamic objects. These high values are ordered in specific patterns dependent on the type of object motion (lateral, longitudinal, mixed, see FIG. 6 for visualization on the image plane).

Figure 6:
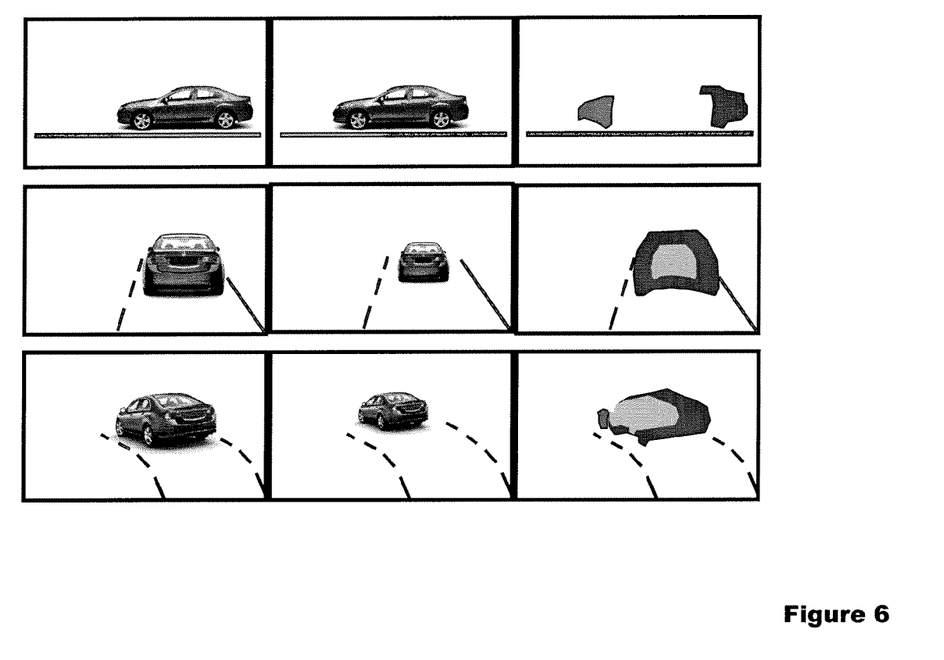
FIG. 6 shows specific patterns for typical object movements in the vehicle domain. From left to right for each row, first and second are two consecutive camera images and third the 3D Warping residuum pattern (visualized on the image plane) for the movement. The color coding for the residuum pattern is the following: Red indicates a negative sign, blue a positive sign and the intensity of the color corresponds to the magnitude. The first row shows pure lateral movement, the second row pure longitudinal movement and the third row a mixture of both.

While the trajectory of longitudinal object motion can be inferred rather directly from its specific longitudinal residuum pattern, lateral motion components need to be inferred indirectly from its specific lateral pattern. Here the proposed combination of the 3D Warping with POM has particular advantages. More specifically, patterns that indicate lateral motion can be post-processed by POM. For this purpose, the computationally intensive POM can be restricted to a certain image area based on the 3D Warping results. Furthermore, the POM is parameterized optimally based on these patterns (the direction and expected amplitude of the optical flow is heavily restricted). Based on POM, the correspondence problem of the 3D Warping residuum for lateral motion is solved and a 3D object trajectory can be computed.

Furthermore, the POM can be used for a verification of the noisy 3D Warping results. The noise is due to error-prone depth measurements that typically contain numerous artifacts, which result in false-positive object motion measurements. Additionally, the resolution of the residuum is typically rather small, which is sufficient for the detection of a certain pattern, but potentially insufficient for inferring the specific object motion trajectory. To this end, POM can be used for the refinement of the motion trajectory.

Summarizing, the described combination approach leads to a number of advantages that improve existing approaches in the following points:
The optical-flow-based POM approach is in general resource demanding. The 3D Warping is used to preselect the parts of the scene, on which the POM is computed on. This reduces the computation time and increases the quality.
Furthermore, the POM is parameterized optimally based on the 3D Warping results, which lowers the computational demands of the POM-based verification process. More specifically, such parameters and optimization can be a local restriction in the search direction of the optical flow, a restricted search range in pixels, restrictions in the used scales, restrictions regarding the temporal integration of flow vectors, restrictions regarding the spatial integration of flow vectors, restrictions or relaxations regarding used confidence thresholds that support flow values e [17] for the existing parameters of a state-of-the-art, correlation-based optical flow computation method)
Different from pure optical flow-based approaches that detect object motion on the image plane (i.e., in pixels in the perspective image), the 3D Warping approach, delivers information of the object motion in 3D world coordinates (i.e., direction and magnitude in meters). However, also the detected object motion in pixels in the image delivers precious information for typical image processing algorithms. The here proposed algorithm combines the prediction of pixel-wise motion of image pixels (called image Warping) and the prediction of 3D world coordinates directly.
Optical flow-based approaches are restricted to the detection of object motion that is orthogonal to the ego vehicle motion (lateral motion). In the opposite, 3D Warping is targeted at the detection of longitudinal object motion. Different from that the proposed approach combines both, allowing the precise detection of object motion in lateral and longitudinal direction in an optimal way.
3D Warping and Proper Object Motion Run in Parallel There are two combinations possible, first the 3D Warping results are verified and refined by POM and second the other way around.

Starting with POM results are verified and refined by 3D Warping results (POM and 3D warping run in parallel and are integrated at a later stage, which improves the conciseness of the results). Dense (i.e. it is computed for all image pixels) optical flow has the problem of being noisy and error prone at image regions with a low amount of structure (correspondence search becomes ambivalent). Although the gathered confidence measure (as a by-product of the optical flow computation) might be high, the flow vectors might still be wrong. In this case a late combination of the results of (the independently running) 3D Warping might be used to verify the POM results. Furthermore, since the optical flow is resource demanding and is hence computed on a low resolution, the gathered 3D Warping results (usually available on a higher resolution) can be used to refine (i.e. improve the resolution of) the flow vectors.

For the second combination the 3D Warping results are verified and refined by the POM results (POM and 3D warping run in parallel and are integrated at a later stage, which improves the conciseness of the results). Following EP 09 15 0710 and the introductory part of invention EP 09 16 1520 (see Tab. 2) the 3D Warping is especially suitable for the detection of longitudinal motion (as the preferred motion type in the traffic domain). In case of lateral object motion or a combination of lateral and longitudinal motion a correspondence problem might arise (which 3D clusters in the 3D residuum belong together). Here the POM results might be helpful, since these are most suitable for the detection of lateral object motion.

It should be understood that the foregoing relates only to embodiments of the invention and that numerous changes and modifications made therein may be made without departing from the spirit and the scope of the invention as set forth in the following claims.

GLOSSARY

Top-Down Knowledge

Information coming from other modules in the system with higher level of information integration, e.g. the environmental model representing all detected objects.

Driver Assistance System (DAS)

A system that supports the driver in typical driving tasks as well as in dangerous situations. Following traffic laws (e.g. the German Straßenverkehrsordung StVO) the DAS reactions should stay controllable and must allow overruling influence by the driver. Based on that fully autonomous behavior generation is not possible for DAS on the market.

Advanced Driver Assistance System (ADAS)

A Driver Assistance System that incorporates numerous modules and links between modules. All these components are integrated into a complex framework of sensors, computational hardware and actors that all are intertwined and interact. As opposed to that a conventional Driver Assistance System is marked by a restricted complexity and a lack of interfaces for the sharing of information with other modules in the vehicle. Additionally, a conventional Driver Assistance System is targeted at a single task and application area (e.g. highway).

Environmental Envelope:

The X-Z plane (horizontal position coordinate and depth) is an aggregated part of the 3D voxel cloud. Still the environmental envelope is represented in the 3D domain (height Y is constant) and is not projected to the image for detecting dynamic objects. Therefore, envelope is an illustration for the border line to the first objects in a X-Z plane. The number of X-Z planes with different heights can vary and also be used to approximate certain height intervals in one or more X-Z planes.

External Sensors

Can be any kind of depth sensor, such as a 3D depth sensor (e.g. rotating laser scanner), a 2D depth sensor (e.g. Photonic Mixer Device), a 1D depth sensor (e.g. a laser scanner), Stereo camera, etc. Also a navigation system can be seen as an external sensor, thus it can provide detailed information about the environment. Therefore, a navigation system can be a virtual external sensor, using the current GPS position and its map data to provide depth information of the current surrounding. In general, the meaning for external sensor is a sensor that gathers/provides information of the surrounding environment.

Internal Sensors

In general, the meaning for internal sensor is a sensor that gathers/provides information of the own movement independent of information from the environment. This can range from a simple speed indicator (measuring the wheel rotation) up to a ring laser gyroscope for the angle of rotation.

Prediction in Future/Passed Time

For detecting ego moved objects in general two ways of prediction exist. On the one hand, the straight forward approach, were the scene model at time t−1 is predicted into the next time step t in the future (forward Warping). Afterwards, the prediction is compared with the measurement and the ego moved objects extracted. On the other hand, the measurement of the current time step t can be projected to the previous time step t−1, which we refer to the passed time (or backward Warping). And the previous measurement is compared with the projection and the ego moved objects extracted.

Proper Object Motion (Proper Motion)

The term Proper Object Motion (POM) relates to the optical flow based 2D Warping approach described in [12]. Therefore, object motion which was detected by POM is referred to as proper motion.

Scene Model

Based on other processing modules, like the current scene context (e.g. highway, country road, inner city) and measurements from the current surrounding environment, certain models can be learned or extracted. To this end, when driving on a highway the guardrails can be extracted by a combination of measurement and knowledge incorporation. Additionally, a data driven approach can be used fitting typical geometric shapes to the measured data.

Scene Representation (Also 3D Representation)

A 3D representation abstracts from the sensor layer and is not bound to a single sensor. To this end, a 3D representation can be a 3D-grid, a voxel-graph, etc. Therefore, a 3D representation maps a certain part of the surrounding environment to its internal memory, but decoupled of the sensor layer.

LITERATURE

[1] R. E. Kalman, "A new approach to linear filtering and prediction problems," *Transactions of the ASME-Journal of Basic Engineering*, vol. 82, no. Series D, pp. 35-45, 1960.

[2] M. Nieto, L. Salgado, F. Jaureguizar, and J. Cabrera, "Stabilization of inverse perspective mapping images based on robust vanishing point estimation," in *IEEE Intelligent Vehicles Symposium*, 6 2007.

[3] K. Konolige, "Small vision system: Hardware and implementation," in *Eighth International Symposium on Robotics Research*, 1997.

[4] Xuming Luan, "Experimental Investigation of Photonic Mixer Device and Development of TOF 3D Ranging Systems Based on PMD Technology", PHD Thesis, 2001.

[5] www.velodyne.com/lidar

[6] H. Badino, U. Franke, C. Rabe and S. Gehrig. "Stereo Vision-Based Detection of Moving Objects under Strong Camera Motion". In 1st International Conference on Computer Vision Theory and Applications (VISAPP), Setúbal, Portugal. 25-28 February, 2006.

[7] J. Schmüdderich, V. Willert, J. Eggert, S. Rebhan, C. Goerick, G. Sagerer and E. Körner. "Estimating object proper motion using optical flow, kinematics, and depth information" in IEEE Transactions on Systems, Man and Cybernetics, Part B, Volume 38, Issue 4, Pages 1139-1151, 2008.

[8] T. Vaudrey, H. Badino and S. Gehrig "Integrating Disparity Images by Incorporating Disparity Rate". In 2nd Workshop "Robot Vision", Auckland, New Zealand, Feb. 18-20, 2008.

[9] I. N. Bronstein, K. A. Semendjajew, G. Musiol and H. Mülig, "Taschenbuch der Mathematik", Verlag Harri Deutsch, Frankfurt am Main, 1999.

[10] B. Jaehne, "Digital image processing", Springer, Berlin, 2005.

[11] R. Kastner, J. Fritsch and T. Michalke, Object motion detection based on multiple 3D Warping algorithms, 2009, EPO Application Number 09 150 710.3.

[12] J. Eggert, V. Willert, J. Schmuedderich and S. Rebhan, Estimating objects proper motion using optical flow, kinematics and depth information, WO 2009/024349 A (2009-02-26).

[13] S. Shimizu: "Moving object detection by mobile stereo omni-directional system (SOS) using spherical depth image", Pattern Analysis and Applications, vol. 9, no. 2-3, pages 113-126, 2005.

[14] A. Taluder et. al.: "Real-time detection of moving objects from moving vehicles using dense stereo and optical flow", International Conference on Intelligent Robots and Systems (IROS), Japan, 2004.

[15] R. Cutler, M. Turk: "View-based interpretation of real-time optical flow for gesture recognition", Automatic Face and Gesture Recognition, 1998, Proceedings, 3rd IEEE International Conference on NARA, Japan, 1998.

[16] W. Schaarschmidt, J. Savage: "Key gesture Spotting for a mobil robot", International Symposium on Robotics and Automation (ISRA), 2004, pp. 1-6.

[17] Willert, V., Eggert, J., Adamy, J., and Koerner, E.: "Non-gaussian velocity distributions integrated over space, time and scales", IEEE Transactions on Systems, Man and Cybernetics B, 36(3):482-493, 2006.

The invention claimed is:

1. A method for detecting dynamic objects in the visually sensed scene of a driver assistance system of a vehicle or robot with ego-motion, comprising the steps of:
providing visual signals of an environment of a vision sensor attached to a vehicle or robot with ego-motion, wherein the vision sensor is a dense depth sensor providing 3D data and wherein an additional sensor provides information on ego-motion,
detecting a proper motion of objects on the input field of the vision sensor based on a detected optical flow,
detecting the motion of objects based on a 3D representation model of the environment and using a 3D warping on the basis of predicted and measured 3D data, the predicted 3D data being generated based on measured 3D data and data representing the ego-motion,
combining the 3D warping-based and the optical flow based object motion detection, by using both detecting steps in parallel and wherein the results of one detecting step is used to verify and refine the results of the other detecting step, wherein the 3D warping defines regions where the optical flow based object motion detection is applied and wherein the optical flow based object motion detection defines regions where the 3D warping is applied, and
storing information on the detected dynamic objects and their measured motion parameters.

2. The method according to claim 1, wherein the information on the detected dynamic objects is used for collision avoidance or path planning.

3. The method according to claim 1, wherein the 3D Warping-based and the optical-flow-based object motion detection are combined such that the search space of the respectively other detection method is restricted and the control parameters are determined and supplied to the respectively other detection method.

4. The method according to claim 1, wherein the 3D Warping based object motion detection parameterizes, as to the direction and amplitude, the optical-flow-based object motion recognition as to the regions, which indicate the lateral motion of objects.

5. The method according to claim 1, wherein only those regions in the 3D Warping based object motion detection which indicate a lateral motion relative to the ego-motion are processed by the optical flow based object motion recognition.

6. The method according to claim 1, wherein the 3D-Warping-based and the optical-flow-based object motion detection are combined such that the detection results of the respectively other detection method is refined and verified.

7. The method according to claim 1, wherein information from a 3D depth sensor is used to generate 3D data.

8. The method according to claim 1, wherein information from a 2D depth sensor is used to generate 3D data.

9. The method according to claim 1, wherein information from a 1D depth sensor is used to generate dense 3D data.

10. The method according to claim 1, the additional sensor provides information on the ego-motion computed based on a single track model.

11. The method according to claim 1, wherein a dense depth sensor provides information of the ego-motion computed based on a single track model.

12. The method according to claim 10, wherein input data for the single track model comes from additional sensors for vehicle velocity and/or yaw-rate.

13. A driver assistance computing unit, designed to carry out a method according to claim 1.

14. A vehicle being equipped with a driver assistance computing unit according to claim 13.

15. An autonomous robot being equipped with a computing unit carrying out a method according to claim 1.

16. A non-transitory computer readable medium, implementing a method according to claim 1 when run on a computing unit.

17. A driver assistance system with a driving path and/or surrounding model generation apparatus, the model generation apparatus comprising:
providing means for providing visual signals of the environment of a vision sensor with ego-motion, wherein the vision sensor is a dense depth sensor providing 3D data and wherein an additional sensor provides information on ego-motion,
detecting means for detecting the proper motion of objects on the input field of the vision sensor based on the detected optical flow,
detecting means for detecting the motion of objects based on a 3D representation model of the environment and using a 3D warping on the basis of predicted and measured 3D data, the predicted 3D data being generated based on measured 3D data and data representing the ego-motion,
combining means for combining the 3D warping-based and the optical flow based object motion detection by using both detecting means in parallel and wherein the results of one detecting means is used to verify and refine the results of the other detecting means, wherein the 3D warping defines regions where the optical flow based object motion detection is applied and wherein the optical flow based object motion detection defines regions where the 3D warping is applied, and
storing means for storing information on the detected dynamic objects and their measured motion parameters.

18. The system according to claim 17, wherein the vision sensor is accessible on a controller area network bus and/or from an additional sensor.

19. The method according to claim 11, wherein input data for the single track model comes from additional sensors for vehicle velocity and/or yaw-rate.

* * * * *